Feb. 7, 1928.

C. SCHAEFFER 1,658,657

REAR SHOCK ABSORBER FOR MOTOR VEHICLES

Filed April 27, 1927   3 Sheets-Sheet 1

INVENTOR
CHARLES SCHAEFFER
BY
ATTORNEY

Feb. 7, 1928.　　　　　　　　　　　　　　　　　1,658,657
C. SCHAEFFER
REAR SHOCK ABSORBER FOR MOTOR VEHICLES
Filed April 27, 1927　　　3 Sheets-Sheet 2

INVENTOR
CHARLES SCHAEFFER
BY
ATTORNEY

Feb. 7, 1928. 1,658,657
C. SCHAEFFER
REAR SHOCK ABSORBER FOR MOTOR VEHICLES
Filed April 27, 1927   3 Sheets-Sheet 3

INVENTOR
CHARLES SCHAEFFER
BY
ATTORNEY

Patented Feb. 7, 1928.

1,658,657

UNITED STATES PATENT OFFICE.

CHARLES SCHAEFFER, OF PARIS, FRANCE, ASSIGNOR TO SOCIETE ANONYME DES ANCIENS ETABLISSEMENTS PANHARD & LEVASSOR, OF PARIS, FRANCE.

REAR SHOCK ABSORBER FOR MOTOR VEHICLES.

Application filed April 27, 1927, Serial No. 187,063, and in France May 8, 1926.

The present invention relates to a rear shock absorber for motor vehicles which serves to limit the relative oscillations of the vehicle frame and the rear axle in the vertical and also in the transverse direction.

The said shock absorber is mounted on the vehicle frame and comprises two vertical discs which are applied in an elastic manner to the respective sides of a vertical plate which is secured to the rear axle, said discs being mounted in a frame which is rotatable on a vertical support which is secured to the vehicle frame and against which the said rotatable frame is applied in an elastic manner.

The friction between the said vertical plate and the said discs will absorb the vertical displacements, and the friction between the rotatable frame and the support will absorb the oscillations of said rotatable frame about the axis of rotation, which axis is parallel with the longitudinal axis of the vehicle.

The appended drawings show by way of example an embodiment of the invention.

Figure 1:
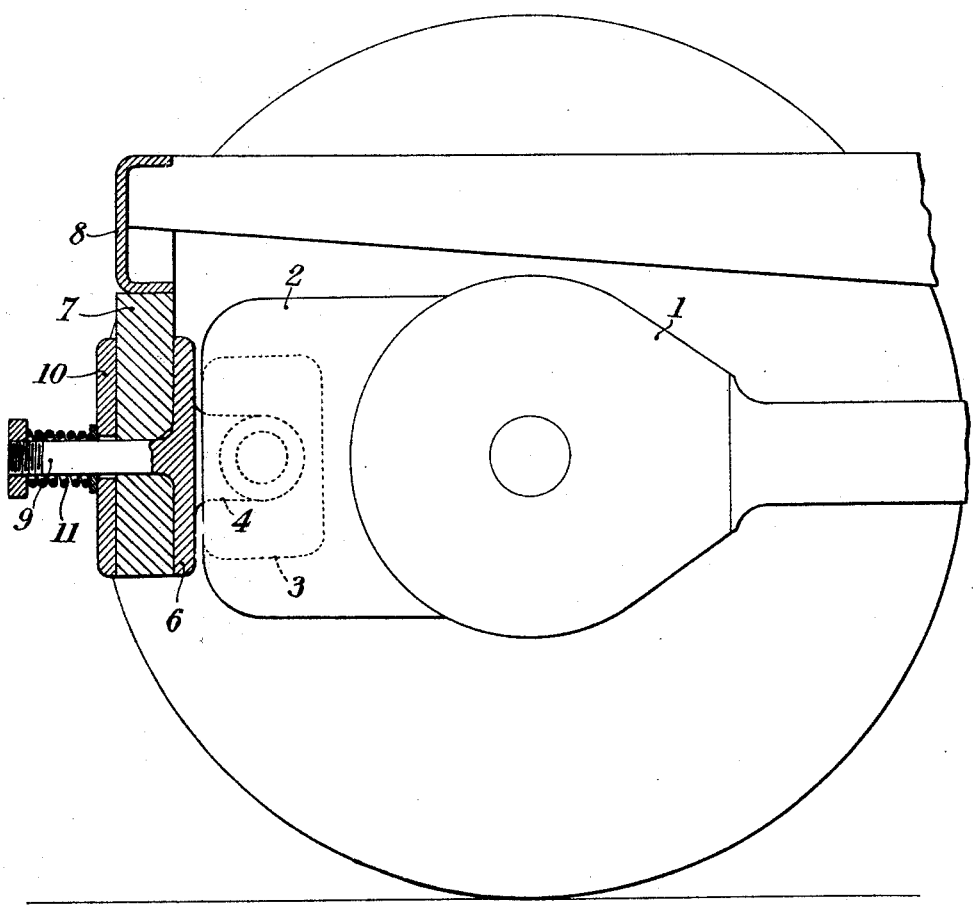
Fig. 1 is a side view of the apparatus,
Fig. 2 an end view, and,
Fig. 3 a plan view.
Figure 2:
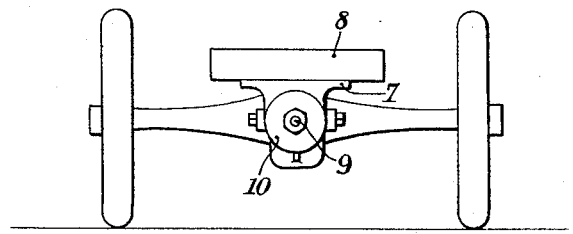
Figure 3:
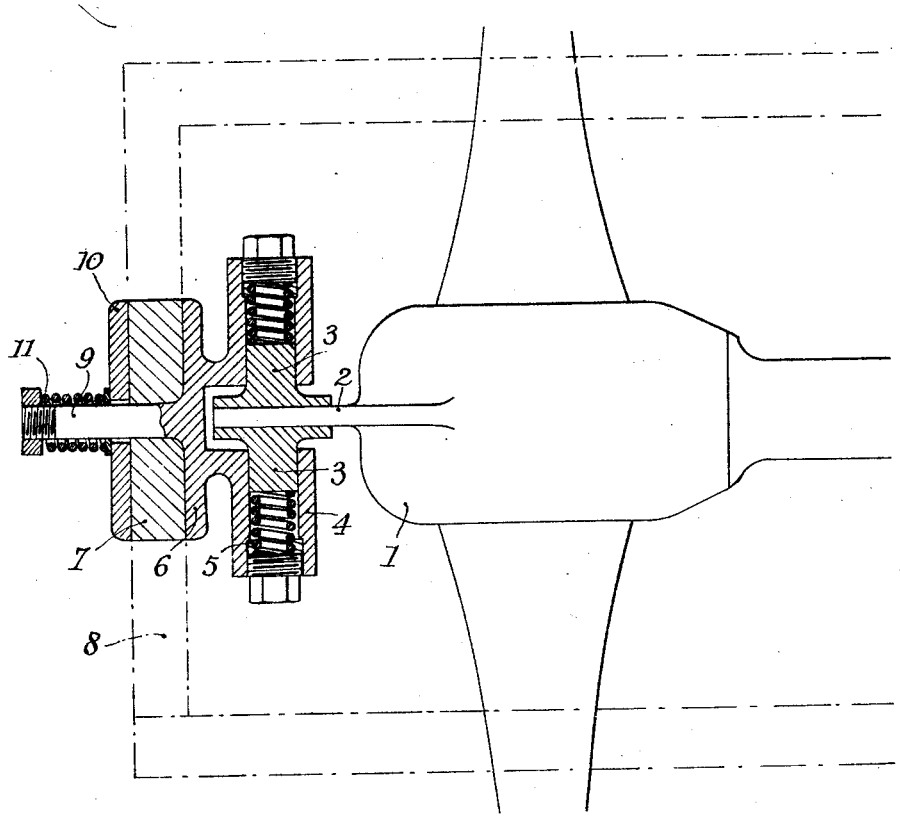

In Figs. 1 to 3, the rear axle 1 is provided with an extension piece 2 which has the form of a vertical plate and is vertically slidable between the two discs 3 which are guided in a case or frame 4; the springs 5 apply the discs 3 against the plate 2 in an elastic manner.

The case 4 comprises a circular portion 6 by which it makes contact with a support 7 which is mounted on the rear cross-piece 8 of the vehicle frame. At the centre of the circular part 6 is disposed a rod 9 which traverses the support 7 and upon which is mounted a plate 10 which is subjected to the action of a spring 11.

The vertical or transverse oscillations of the rear axle with reference to the vehicle frame are permitted by this shock absorber, but the vertical oscillations are damped by the discs 3 whilst the transverse oscillations are damped by the part 6 and the plate 10.

This device is chiefly advantageous when such oscillations have a great amplitude, for instance when the suspension device consists of springs which are placed in the interior of the vehicle frame and are mounted on a support which is rotatable on the thrust tube of the rear axle.

Figure 4:
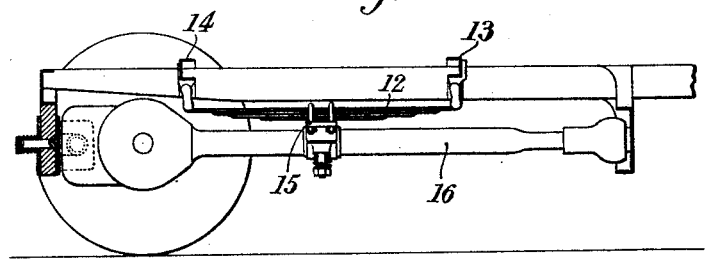
Figs. 4 and 5 are respectively an elevational and a plan view of the apparatus according to the invention, in combination with a rear suspension comprising springs which are disposed in the interior of the vehicle frame.
Figure 5:
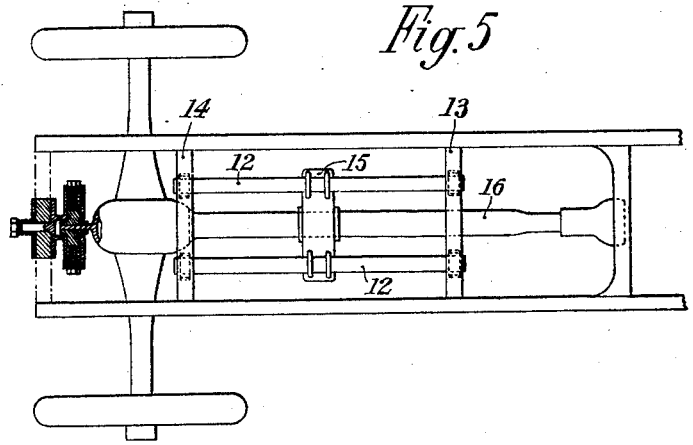

This case is shown in Figs. 4 and 5.

The springs 12 are mounted in the two cross-pieces of the vehicle frame and are secured at one end to a support 15 which is rotatable on the thrust tube 16 of the rear axle.

It is obvious that additional elastic connections may be provided between the rear axle and the vehicle frame whereby these parts will be constantly brought into their normal position of equilibrium.

Having thus described my apparatus, what I claim as new therein, and my own invention, is:—

In a rear shock absorber for motor vehicles, which is adapted to limit the relative oscillations of the vehicle frame and of the rear axle in the vertical and the transverse directions, the combination of two vertical discs, a vertical plate which is secured to the rear axle of said vehicle and upon whose respective opposite faces the said discs are applied in an elastic manner, a frame upon which the said discs are mounted, a vertical support upon which the said frame is rotatable and which is secured to the vehicle frame, said rotatable frame being applied in an elastic manner against the said support, the vertical displacements being damped by the friction produced between said plate and said discs, whilst the oscillations about the axis of rotation of said rotatable frame are damped by the friction produced between the said rotatable frame and the said support.

In testimony whereof I have hereunto affixed my signature.

CHARLES SCHAEFFER.